(12) United States Patent
Ortega Rodríguez et al.

(10) Patent No.: US 10,457,863 B2
(45) Date of Patent: Oct. 29, 2019

(54) COMPOSITION OF AN ORGANIC FOAMING ADDITIVE FOR HIGH TEMPERATURE AND HIGH SALINITY

(71) Applicant: INSTITUTO MEXICANO DEL PETRÓLEO, Mexico City (MX)

(72) Inventors: Alejandro Ortega Rodríguez, México (MX); Norma Araceli García Muñoz, México (MX); José Manuel Martínez Magadán, México (MX); Raúl Oviedo Roa, México (MX); Sonia Ángeles Martínez Reyes, México (MX); Marco Antonio Vélez Domínguez, México (MX); Maribel Amador Ramírez, México (MX); Ana Patricia Medina Montiel, México (MX); Nansy Mónica Sánchez Casas, México (MX); Elizabeth Cervantes Flores, México (MX); Agustín Durán Álvarez, México (MX); Simón López Ramírez, México (MX); Cecilia de los Ángeles Durán Valencia, México (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 65 days.

(21) Appl. No.: 15/840,692

(22) Filed: Dec. 13, 2017

(65) Prior Publication Data
US 2018/0171215 A1 Jun. 21, 2018

(30) Foreign Application Priority Data
Dec. 15, 2016 (MX) .................... MX/a/2016/016673

(51) Int. Cl.
*C09K 8/94* (2006.01)
*C09K 8/86* (2006.01)
*C09K 8/60* (2006.01)

(52) U.S. Cl.
CPC ................ *C09K 8/94* (2013.01); *C09K 8/602* (2013.01); *C09K 8/86* (2013.01)

(58) Field of Classification Search
None
See application file for complete search history.

(56) References Cited

U.S. PATENT DOCUMENTS

| 3,939,911 A | 2/1976 | Maddox, Jr. et al. |
| 4,607,695 A | 8/1986 | Weber |

(Continued)

FOREIGN PATENT DOCUMENTS

| MX | 2016016086 A | 6/2018 |
| MX | 2016016451 A | 6/2018 |

OTHER PUBLICATIONS

Bergström et al. "A Theoretical Analysis of Synergistic Effects in Mixed Surfactant Systems" Langmuir 2000, 16(18), 7173-7181.

(Continued)

*Primary Examiner* — John J Figueroa
(74) *Attorney, Agent, or Firm* — Casimir Jones, S.C.; Anne Reynolds

(57) ABSTRACT

The present invention refers to the formulation of a foaming agent for extreme conditions of salinity, temperature and concentration of divalent ions, including the improvement in the performance in these conditions with respect to the patent MX2008015989 A. Also, the design is presented of the experimental equipment used to characterize and evaluate foaming agents at laboratory level and conditions of pressure, temperature and salinity, in oil fields. The formulation of the foaming agent derived from this invention is a (Continued)

Figure 1:
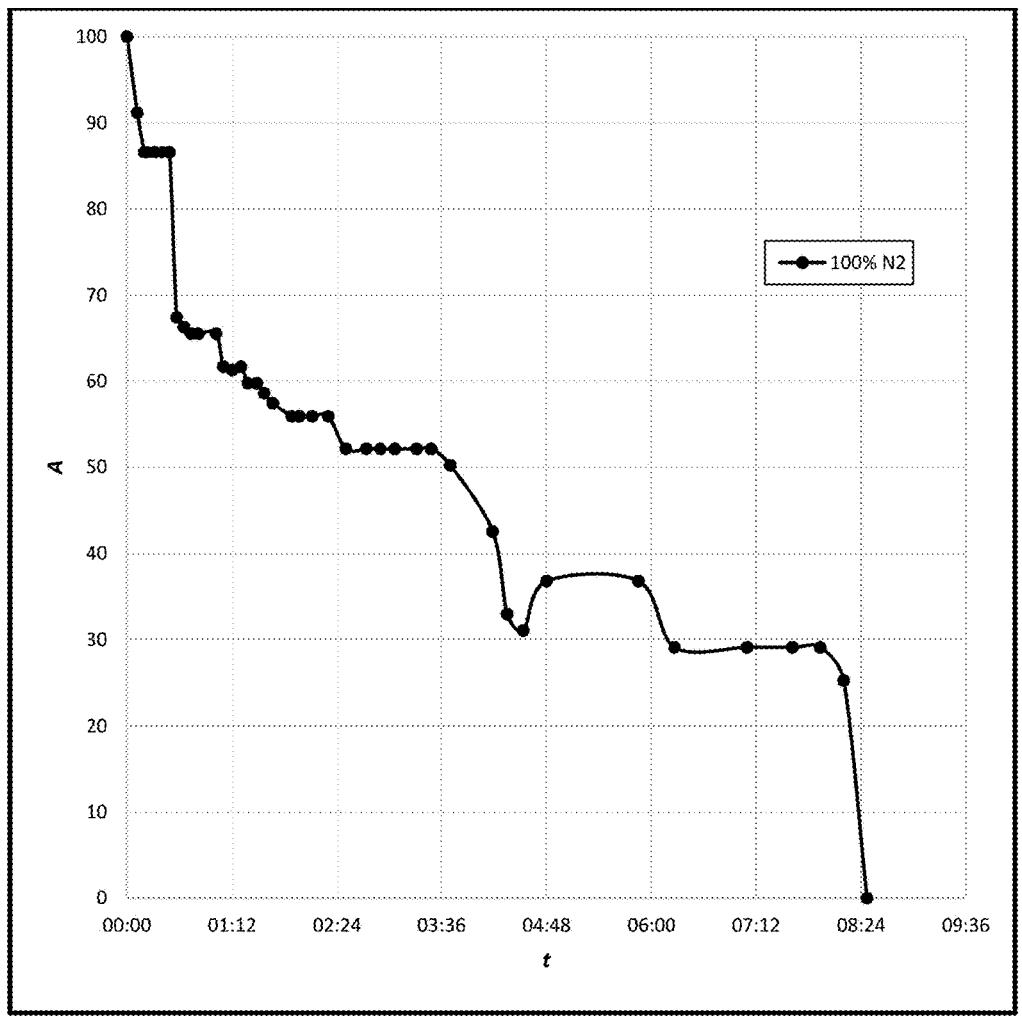

mixture of sodium alpha olefin sulfonates, alkylamido propyl betaines and triethanolamine, capable of giving it the benefit of being stable in temperature and salinity in a wide range, diluted in synthetic and congenital brines. This formulation is applicable for the control of gas mobility and improved oil recovery processes in naturally fractured reservoirs.

15 Claims, 17 Drawing Sheets

(56) References Cited

U.S. PATENT DOCUMENTS

| | | |
|---|---|---|
| 4,703,797 A | 11/1987 | Djabbara |
| 5,049,311 A | 9/1991 | Rasheed et al. |
| 5,273,682 A | 12/1993 | Danzik |
| 5,295,540 A | 3/1994 | Djabbara et al. |
| 7,104,327 B2 | 9/2006 | Harris et al. |
| 2007/0142235 A1 | 6/2007 | Berger |
| 2011/0275546 A1 | 11/2011 | Zamudio Rivera et al. |
| 2014/0151041 A1* | 6/2014 | Hernandez Altamirano ............... C09K 8/594 166/271 |

OTHER PUBLICATIONS

Christov et al. "Synergistic Sphere-to-Rod Micelle Transition in Mixed Solutions of Sodium Dodecyl Sulfate and Cocoamidopropyl Betaine" Langmuir 2004, 20(3), 565-571.

Hirasaki et al. "Surfactant Based Enhanced Oil Recovery and Foam Mobility Control." DE-FC26-03NT15406 of the U.S. Department of Energy, Jul. 2006, 153 pages.

Rodríguez et al. "Kinetic Study in Water—Ethylene Glycol Cationic, Zwitterionic, Nonionic, and Anionic Micellar Solutions" Langmuir 2004, 20(23), 9945-9952.

* cited by examiner

COMPOSITION OF AN ORGANIC FOAMING ADDITIVE FOR HIGH TEMPERATURE AND HIGH SALINITY

CROSS-REFERENCE TO RELATED APPLICATION(S)

This application claims priority to Mexican Patent Application No. MX/a/2016/016673, filed on Dec. 15, 2016, the entire contents of which are fully incorporated herein by reference.

DESCRIPTION

Technical Field of the Invention

This invention relates to the formulation of an organic foaming additive that controls gas channeling and modifies the wettability in naturally-fractured carbonate reservoirs for extreme conditions of salinity (higher than 254,000 ppm of TDS) and temperature (up to 150° C.), to control the early breakthrough of gas in naturally-fractured carbonated reservoir and recover the remaining oil retained in low-conductivity zones. The benefit effect of this formulation, is sourced from the synergistic effect of the supramolecular interaction of alpha olefin sulfonates with cocoamidopropyl betaines, sodium dodecyl sulfonate, sodium 1-hydroxy 1-dodecyl sulfonate, dodecyl trimethyl ammonium bromide and triethanolamine.

BACKGROUND OF THE INVENTION

The foams are dispersions of gas in a small amount of a liquid and have a broad field of application at industrial scale. In the oil industry, the use of foam has been extended to naturally-fractured reservoirs and their main applications has been focused to reduce the produced gas in oil wells completed below the gas-oil contact and to increase the oil recovery factor in enhanced oil recovery processes. In those applications, the stability of the foam plays a paramount role and it depends on the chemical structure of the used surfactant, as well as the temperature, pressure and salinity conditions in the oil reservoir.

The patents that support the main surfactants that have been used to generate foams with application to enhanced oil recovery processes are:

a) U.S. Pat. No. 5,273,682 for Alkyl aryl sulfonate,
b) U.S. Pat. No. 5,049,311 for the Alkoxy-alkyl-benzenesulfonate,
c) U.S. Pat. No. 4,607,695 for Alpha olefin sulfonate
d) U.S. Pat. No. 7,104,327 for Betaines and
e) Report DE-FC26-03NT15406 of the US Department of Energy. for the alkyl ether sulfonate.

The stability of the generated foams by using those surfactants, decreases drastically in some reservoir because their harsh conditions, with temperatures that goes higher than 70° C., salinities higher than 30,000 ppm of STD, and of divalent ions concentrations such as calcium and magnesium, higher than 2,000 ppm.

The following patents are formulations of foaming agents with improved properties to tolerate high concentrations of divalent ions and/or temperature, and therefore, increase the stability of the foams, which are:

1. U.S. Pat. No. 952,474, It is a foam used to improve the sweeping efficiency during the injection of steam or carbon dioxide in oil reservoirs, which are constituted by at least one producing well and one injector well. First, steam is injected until breakthrough occurs in the producing well. Then, a mixture of vapor, non-condensable gas and an aqueous solution of surfactant-polypeptide (sodium salts, ammonium of sulphated ethoxylated alcohols, ethoxylated linear alcohols, linear toluene sulfonates) is injected.

2. U.S. Pat. No. 5,295,540, foams based method for improving the production of hydrocarbons in underground reservoir, which consists of injecting steam and fluids produced within the formation and injecting a mixture of vapor, a non-condensable gas and an aqueous mixture of surfactant and polysaccharides such as linear toluene sulphonates, alkylaryl sulphonates, dialkylaryl sulphonates, alpha olefin sulphonates and alpha olefin sulphonate dimerizers.

3. U.S. Pat. No. 4,703,797, which consists on the generation of a foam where the displacement fluid is dispersed in an aqueous based solution of surfactant. Being the foam, a surfactant blend based on lignosulfonates with anionic, non-ionic and amphoteric surfactant, in order to improve the sweeping efficiency in enhanced oil recovery processes.

4. U.S. Pat. No. 3,939,911, System of three surfactants, Alkyl or alkylarylsulfonate which is a water soluble salt, as a surfactant the phosphate ester with average PW less than 1000 UMA, another surfactant with sulfobetaine base; applied to improved recovery processes in formation waters of 200 to 14,000 ppm of dissolved polyvalent ions (Ca, Mg), this combination being stable up to a temperature of 107° C., resistant to bacteria and inhibits the formation of scale.

5. U.S. Pat. No. 7,104,327, methods for fracturing high-temperatures subterranean oil-bearing formation with a viscous, aqueous, foamed fracturing fluids, made with water, a terpolymer of 2-acrylamido-2-methylpropane sulfonic acid, acrylamide and acrylic acid or salts, a gas, a C8-C22 foaming agent alkylamido-betaine, alpha-olefin sulfonate, trimethyl-taloyl-ammonium chloride, C8-C22 alkylethoxylated sulfate and trimethyl-coco-ammonium chloride. Cocoamidopropylbetaine is mentioned as a special foaming agent and a viscosity breaker for viscosity control. The use of mixtures of alkylamido-betaine and alpha olefinsulfonates to produce foams is not mentioned, nor does it increase the stability of the foams.

6. Paper: Improving the foam performance formobility control and improved sweep efficiency in gas flooding. He mentions that the stability and apparent viscosity of a foam generated by alpha olefinsulfonates in brine of 30,000 and 120,000 ppm of STD, is improved when formulated with partially hydrolyzed polyacrylamide base polymers or xanthan gum type biopolymers. It was also mentioned, that the stability of the foam generated with the twelve carbon alpha olefinsulfonates is substantially increased when formulated with surfactants of the amine oxide type.

It has been reported (Langmuir 2000 16, 7173, Langmuir 2004 20, 9945) the synergistic effect achieved by using alkylamidopropyl betaine with anionic surfactants of sodium alkyl ether sulfate and sodium alkyl sulfate types. It was remarked the capacity of the alkylamidopropyl betaines to stabilize and to improve the rheological properties (viscosity) of the generated foams, which have application in shampoos and conditioners for hair.

In the paper: Synergistic sphere-to-rodmicelle transition in mixed solutions of sodiumdodecyl sulfate and cocoamidopropylbetaine (Langmuir 2004 20,565-571) indicates that the synergistic effect between cocoamidopropylbetaine and sodium dodecyl sulfate is due to an electrostatic attraction between the heads of both surfactants.

Patent US 2007/0142235 A1, protects a composition and process of recovery of hydrocarbons, which consists of injecting an aqueous solution into the production formation, through one or more injection wells, pushing the solution within the formation to recover the hydrocarbon. The aqueous solution is composed of one or more amphoteric surfactants of the alkylamidobetaine type which form a viscoelastic surfactant gel which can simultaneously reduce the interfacial tension and increase the viscosity of the injected fluid in certain oils and brines. Viscoelastic gels are tolerant to electrolytes and multivalent cations and are useful in reservoirs that have medium to high temperatures, high salinities, high concentrations of divalent ions and low porosity. It also indicates that the secondary surfactant can be from the anionic, cationic or non-ionic group and that the polymer providing the viscosity can be from the group of polyacrylamide, partially hydrolyzed polyacrylamide, xanthan gum, hydroxyethyl cellulose or guar gum. It also mentions that the combination of alkylamidobetaine with secondary surfactants of the linear type sodium dodecylbenzenesulfonate and sodium arylalkyl-allyl sulfonate reduces the interfacial tension and increases the viscosity of the system. It does not mention the use of amphoteric surfactants based on alkylamidobetaines and their mixtures to generate foams, nor the mixtures of alkylamidobetaines and anionic surfactants of the alpha olefin sulfonate type.

In none of the above references claim the use of foaming additives that apply the synergistic effect of sodium alpha olefinsulfonates and alkylamidopropyl betaines for the development of formulations that are stable in environments of high salinity and temperature.

In the patents MX 2008015989 and WO 2010068082 the advantage of formulations of foams working efficiently in environments of high salinity, temperature and a high concentration of divalent calcium and magnesium ions is stated, in addition to the foam formed having a higher stability with respect to to that generated by the products that are used worldwide as described in the aforementioned patents. Derived from these patents 2 foaming products were generated called:

IMP-ESAT-1000 (salinity 120,000 ppm STD, temperature 100° C.)
IMP-ESAT-2000 (salinities up to 250,000 ppm STD, temperature 100° C.)

Given the chemical characteristics of the raw material that make up the IMP-ESAT-1000 and 2000 products, they support temperature and salinities up to 100° C. and 85,000 ppm STD respectively, and therefore given the extreme field conditions of salinity and temperature in Mexico, that exceed the aforementioned values, a new formulation was developed that allows to extend its tolerance to new salinity conditions higher than 254,000 ppm SDT and temperatures up to 150° C.

BRIEF DESCRIPTION OF THE DRAWINGS OF THE INVENTION

FIG. 1. Behavior of foam stability at 9 psi and 70° C. as a function of time, prepared with brine at 0.12% by weight of the foaming product, foamed with nitrogen gas. Where A, is the relative height of the foam in percentage and t, is the stability time at that foam height in hours.

Figure 2:
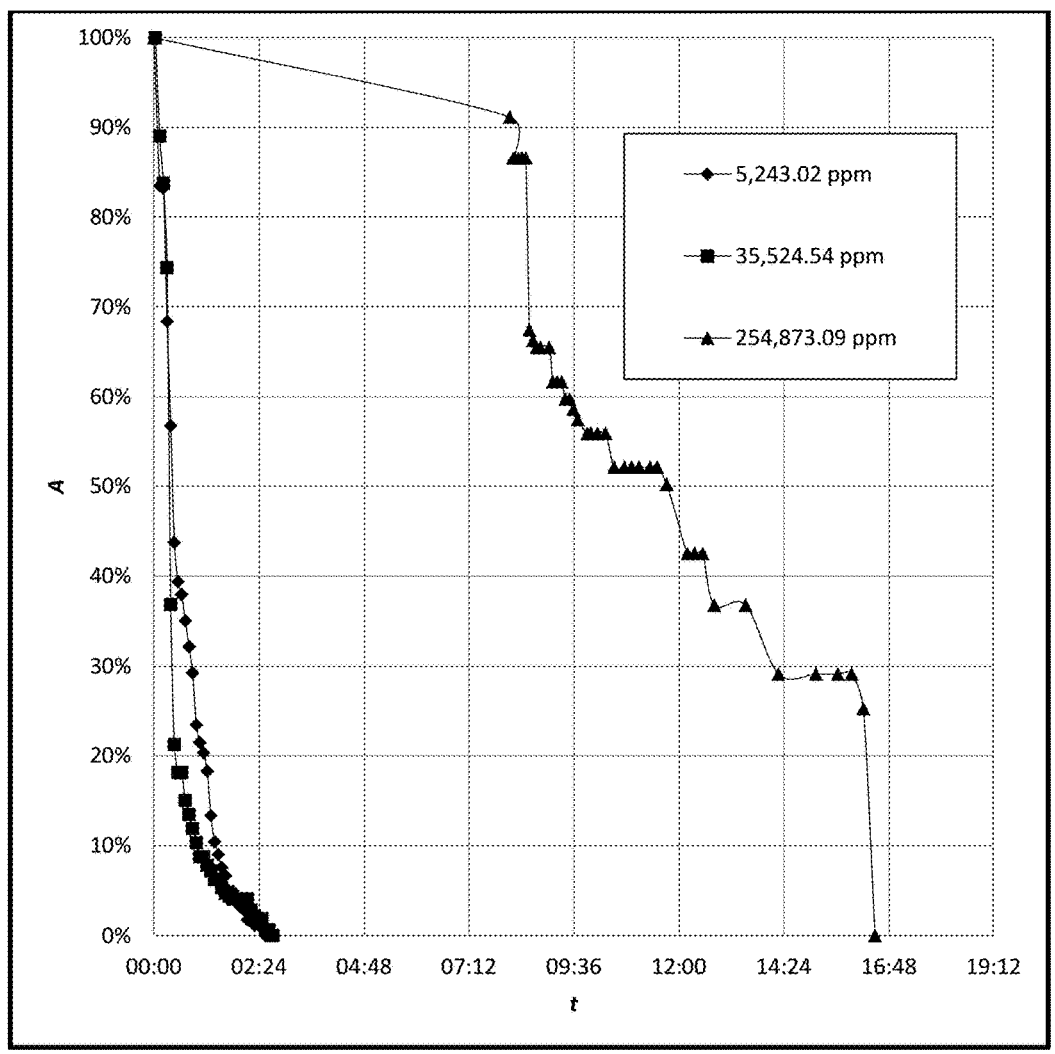

FIG. 2. Behavior of the stability of the foaming formulation at 9 psi and 70° C. as a function of time for three different type of brines at 0.12% wt. of the foaming product, foamed with nitrogen gas. Where A, is the relative height of the foam in percentage and t, is the stability time at that foam height in hours.

Figure 3:
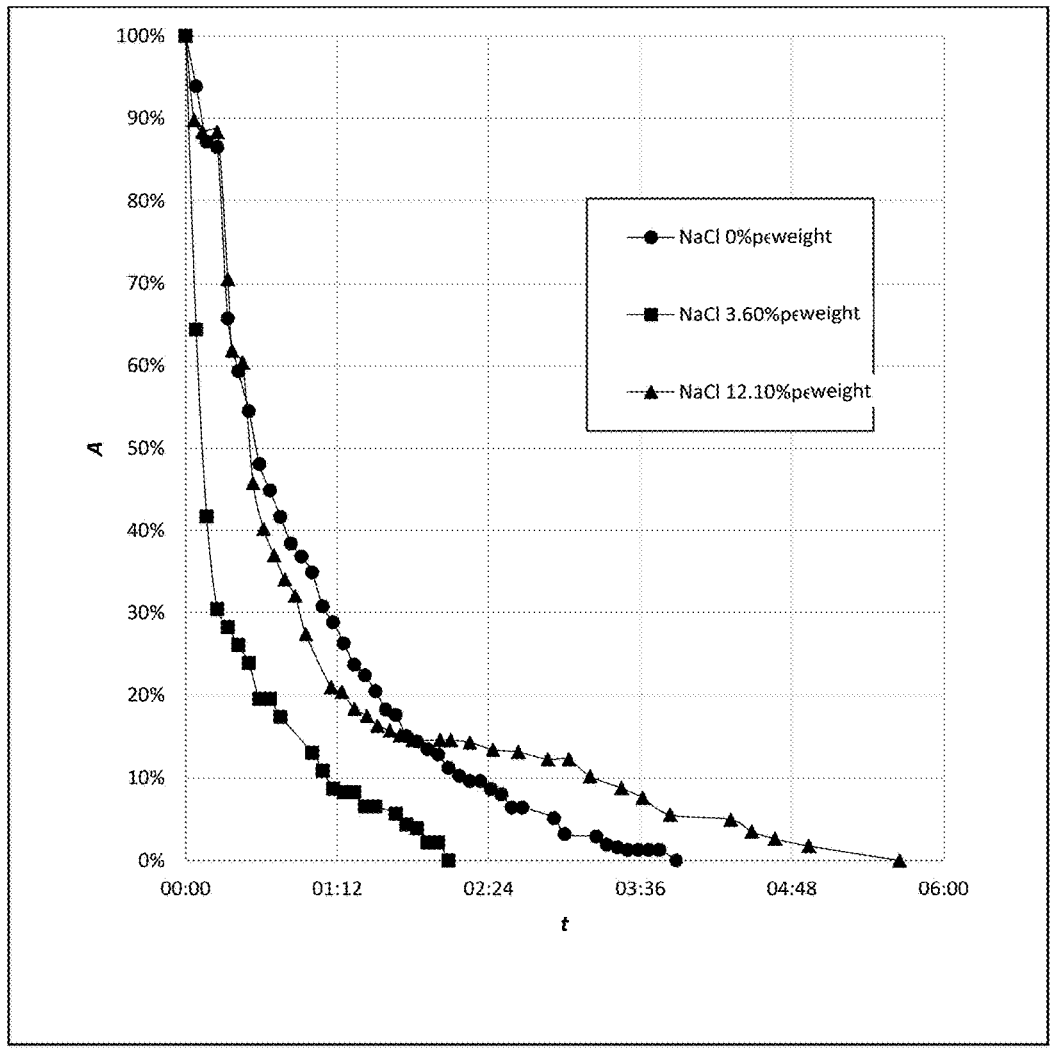

FIG. 3. Behavior of foam stability at 9 psi and 70° C. as a function of time at different concentrations of NaCl, at 0.12% by weight of the foaming product and foamed with nitrogen gas. Where A, is the relative height of the foam in percentage and t, is the stability time at that foam height in hours.

Figure 4:
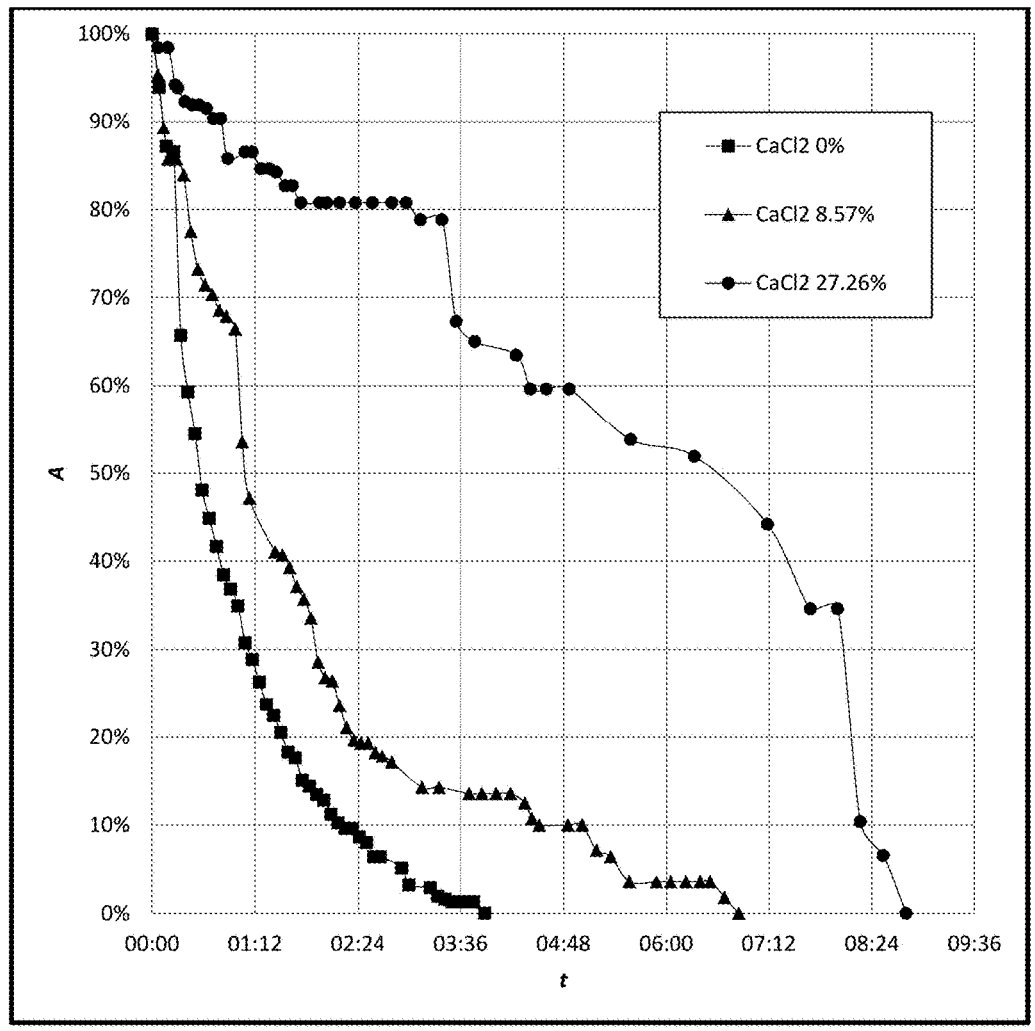

FIG. 4. Behavior of the stability of the foam at 9 psi and 70° C. as a function of time at different concentrations of CaCl2, at 0.12% by weight of the foaming product and foamed with nitrogen gas. Where A, is the relative height of the foam in percentage and t, is the stability time at that foam height in hours.

Figure 5:
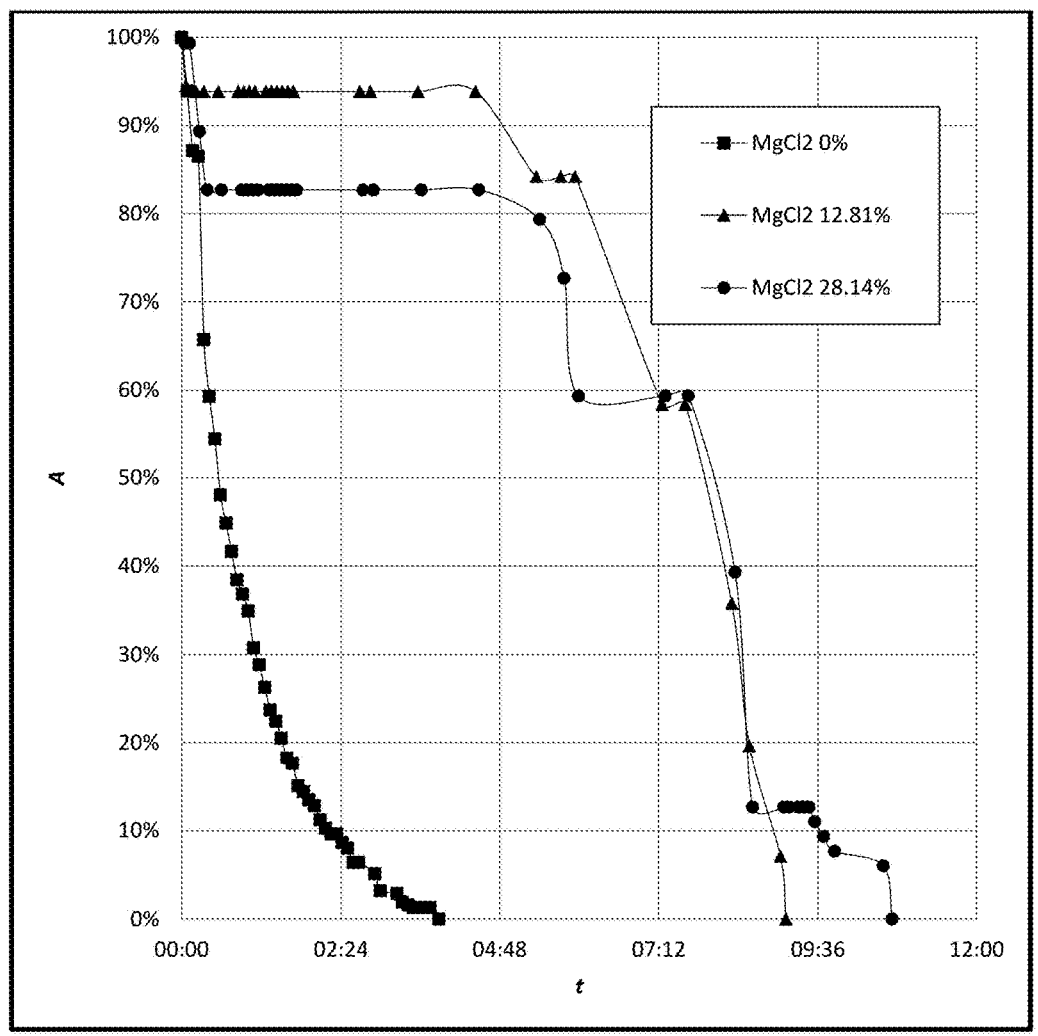

FIG. 5. Behavior of foam stability at 9 psi and 70° C. as a function of time at different concentrations of MgCl2, at 0.12% by weight of the foaming product and foamed with nitrogen gas. Where A, is the relative height of the foam in percentage and t, is the stability time at that foam height in hours.

Figure 6:
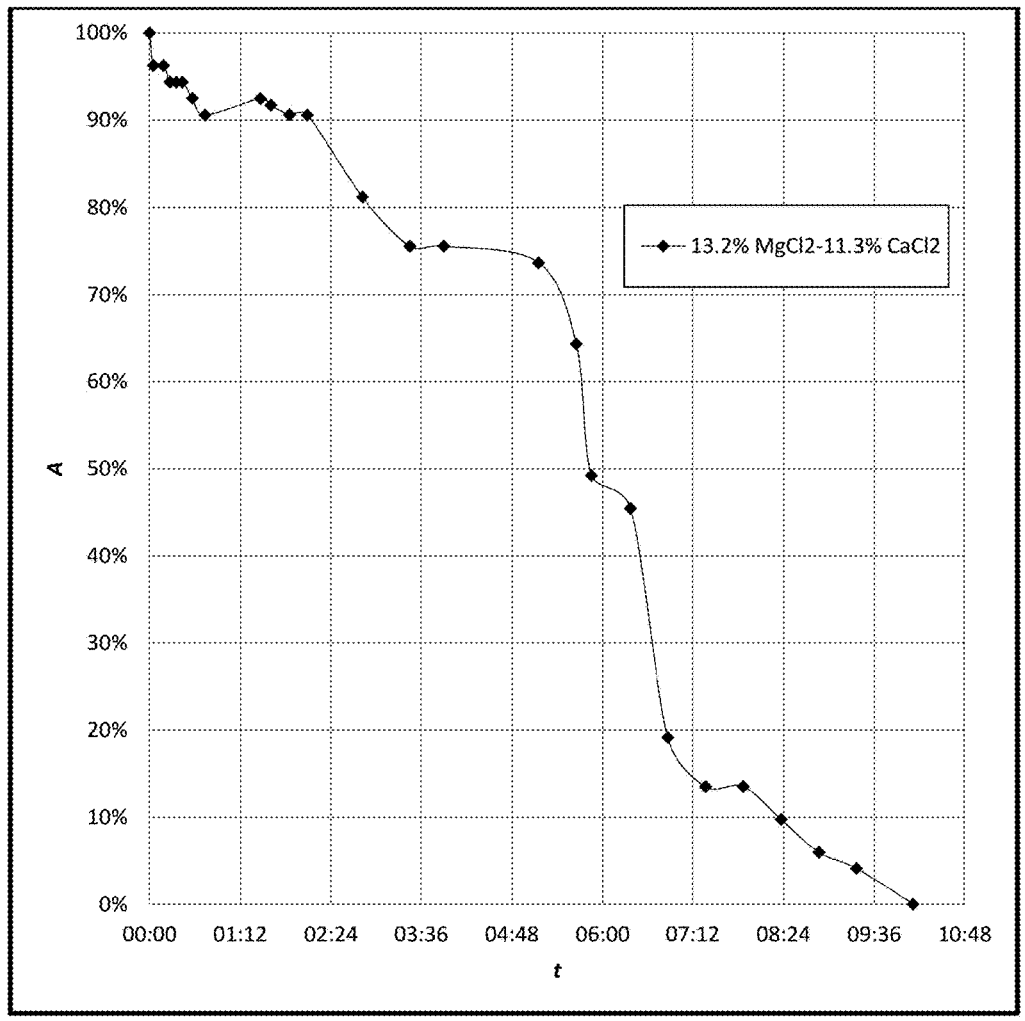

FIG. 6. Behavior of Foam stability at 9 psi and 70° C. as a function of time, prepared in brine containing CaCl2 and MgCl 2, at 0.12% wt. of the foaming product and foamed with nitrogen gas. Where A, is the relative height of the foam in percentage and t, is the stability time at that foam height in hours.

Figure 7:
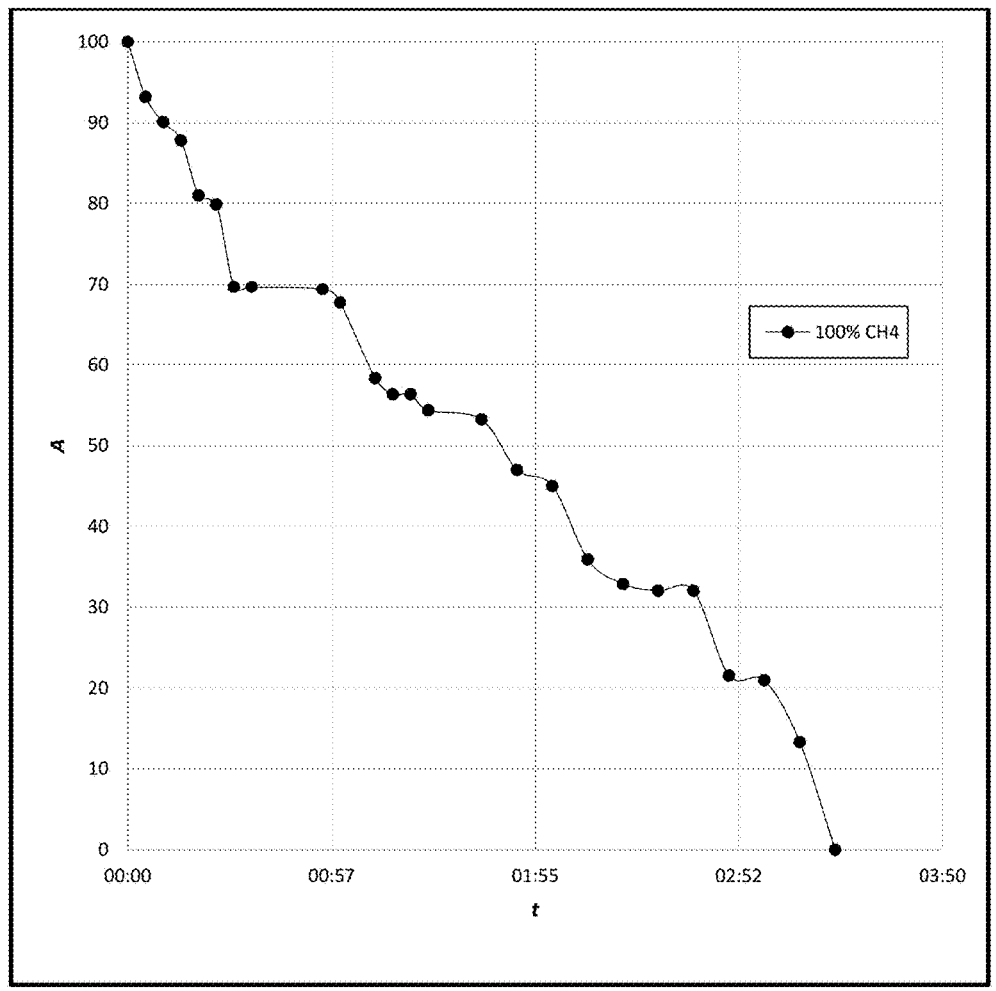

FIG. 7. Behavior of Foam stability at 9 psi and 70° C. as a function of time, prepared with brine at 0.12% wt. of the foaming product, foamed with methane gas. Where A, is the relative height of the foam in percentage and t, is the stability time at that foam height in hours.

Figure 8:
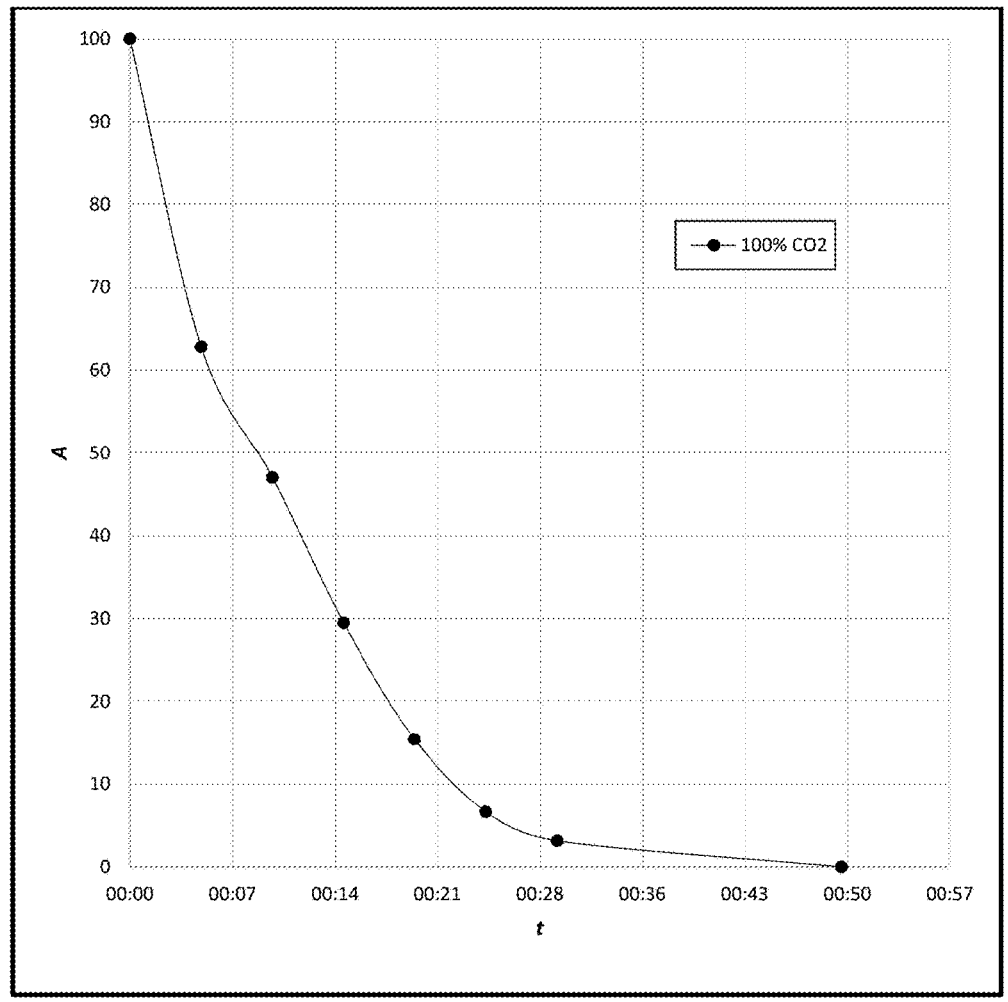

FIG. 8. Behavior of Foam stability at 9 psi and 70° C. as a function of time, prepared with brine at 0.12% wt. of the foaming product, foamed with CO2 gas. Where A, is the relative height of the foam in percentage and t, is the stability time at that foam height in hours.

Figure 9:
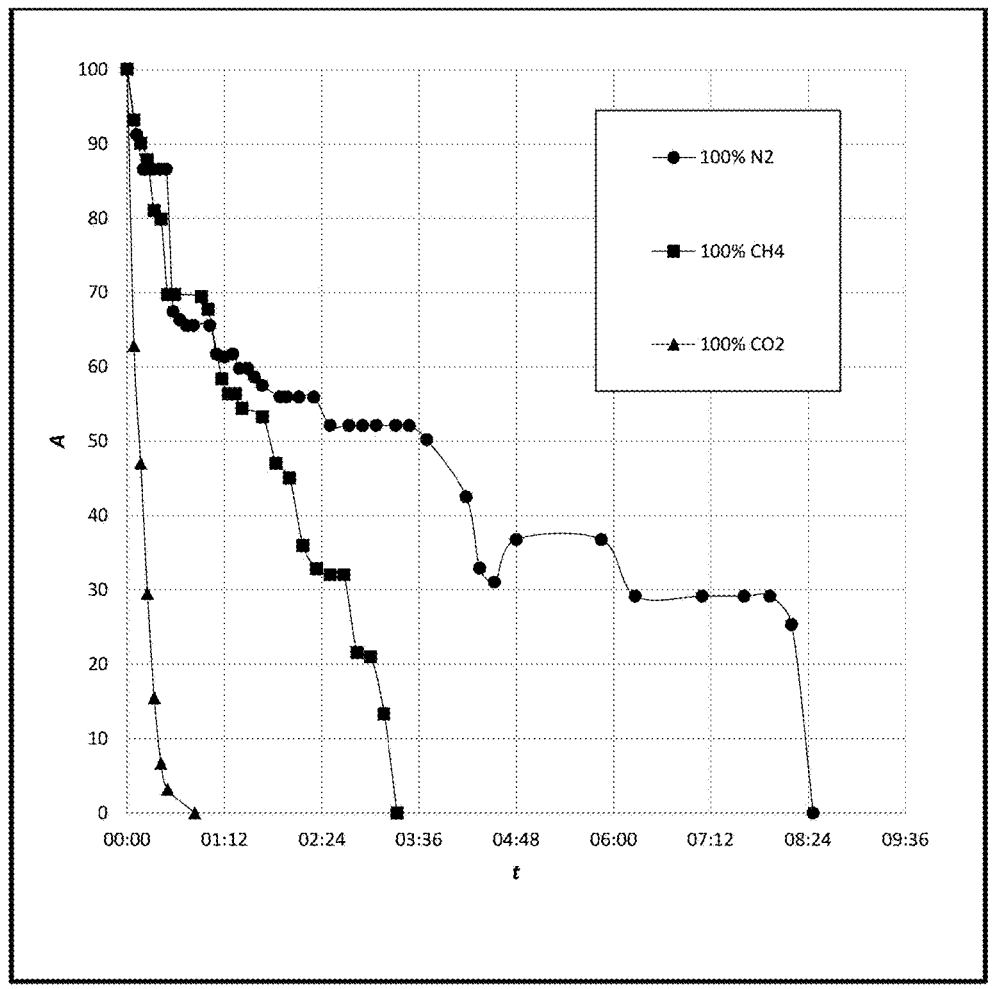

FIG. 9. Comparative of the Behavior of Foam stability at 9 psi and 70° C. as a function of time, prepared with brine at 0.12% wt. of the foaming product, foamed with N2, CH4 and CO2 gas. Where A, is the relative height of the foam in percentage and t, is the stability time at that foam height in hours.

Figure 10:
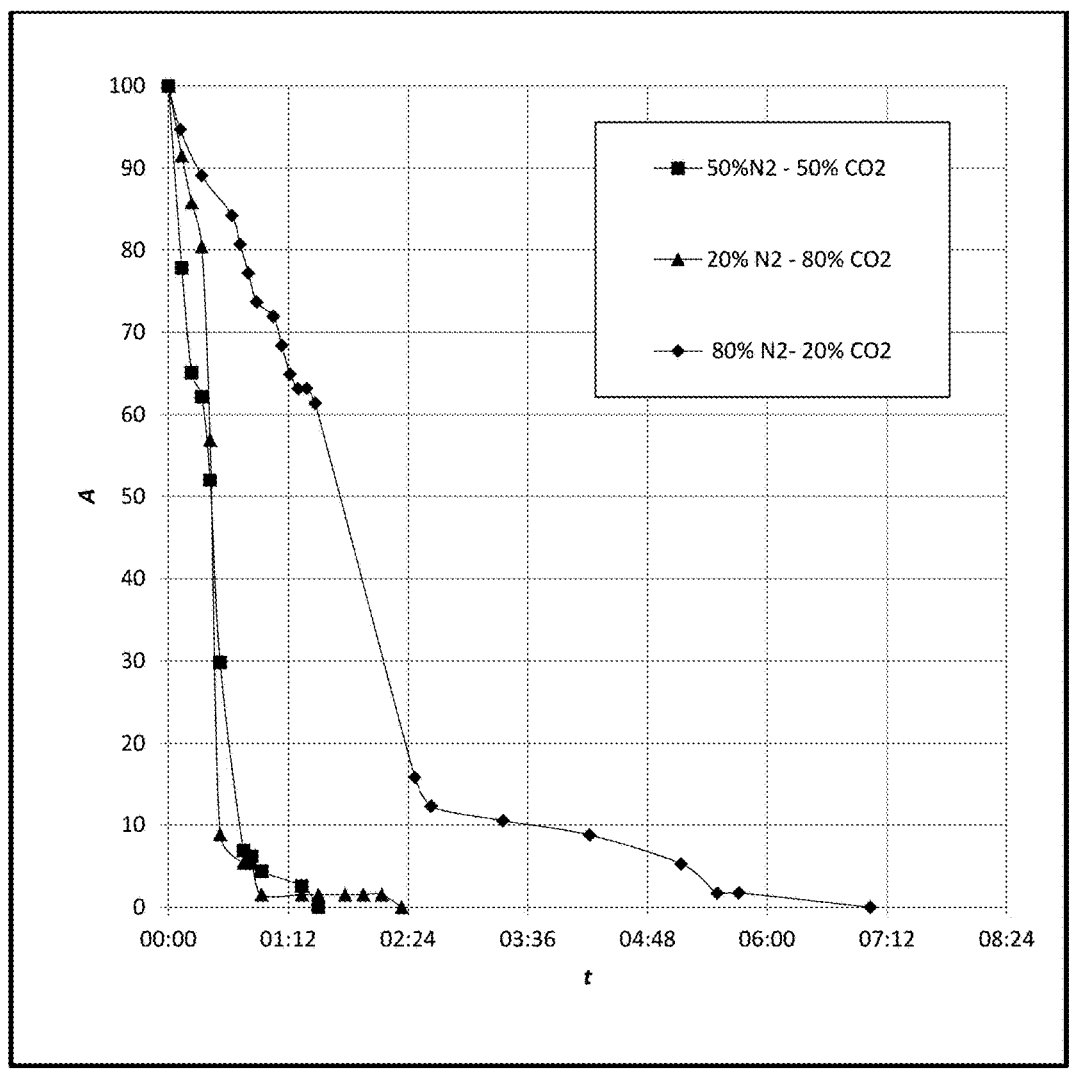

FIG. 10. Comparative of the Behavior of Foam stability at 9 psi and 70° C. as a function of time, prepared with brine at 0.12% wt. of the foaming product, generated with gas mixtures N2-CO2. Where A, is the relative height of the foam in percentage and t, is the stability time at that foam height in hours.

Figure 11:
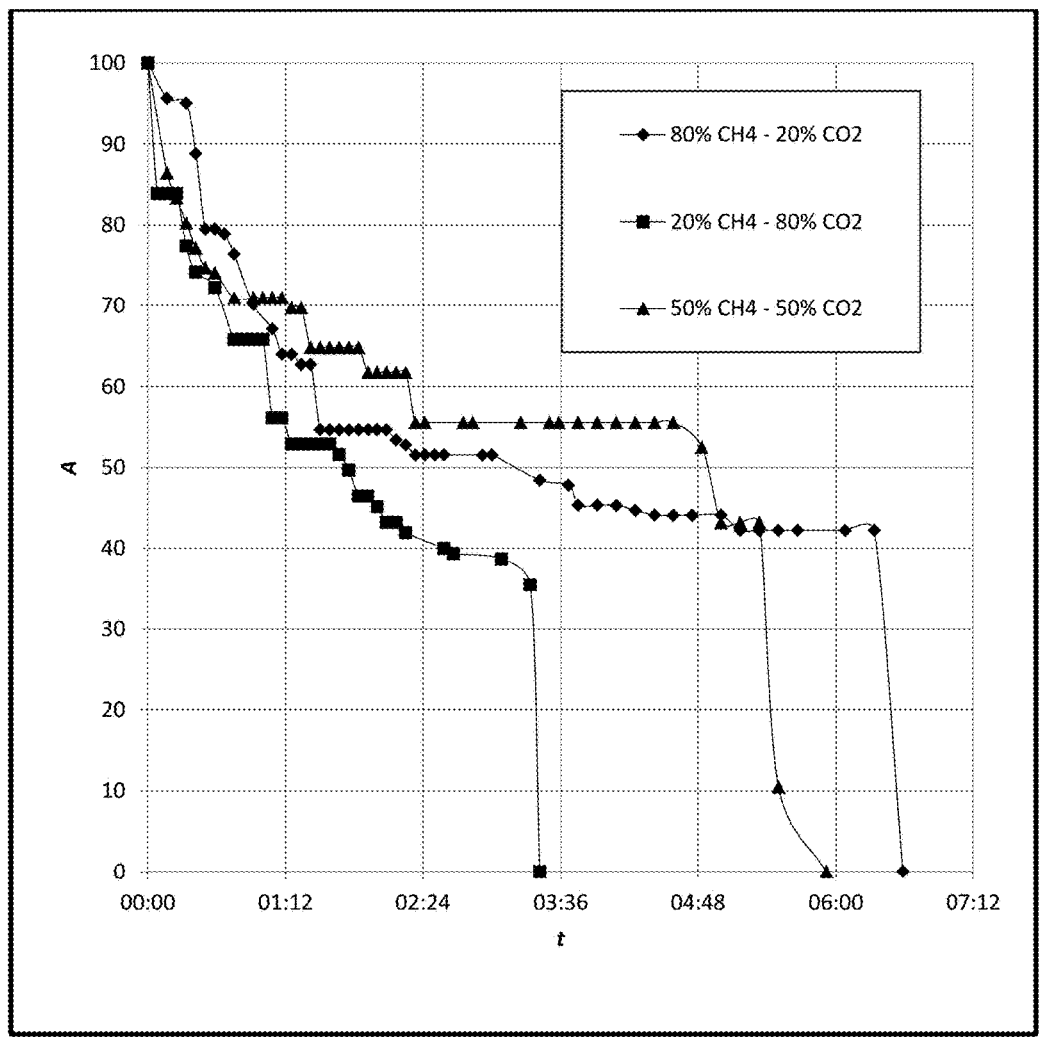

FIG. 11. Comparative of the behavior of foams stability at 9 psi and 70° C. as a function of time, prepared with brine at 0.12% wt. of the foaming product, foamed with CH4-CO2 gas mixtures. Where A, is the relative height of the foam in percentage and t, is the stability time at that foam height in hours.

Figure 12:
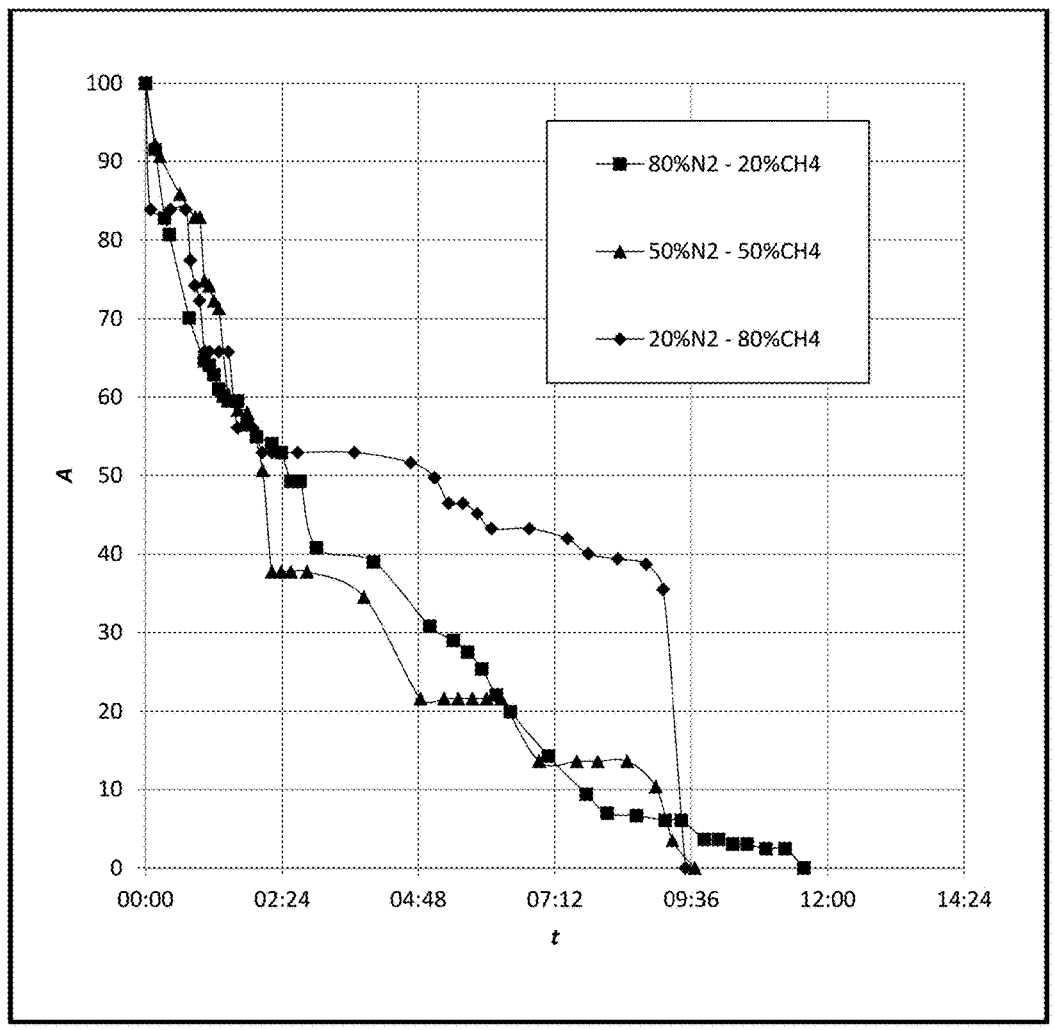

FIG. 12. Comparative of the behavior of the behavior of foams stability at 9 psi and 70° C. as a function of time, prepared with brine at 0.12% wt. of the foaming product, foamed with gas mixtures N2-CH4. Where A, is the relative height of the foam in percentage and t, is the stability time at that foam height in hours.

Figure 13:
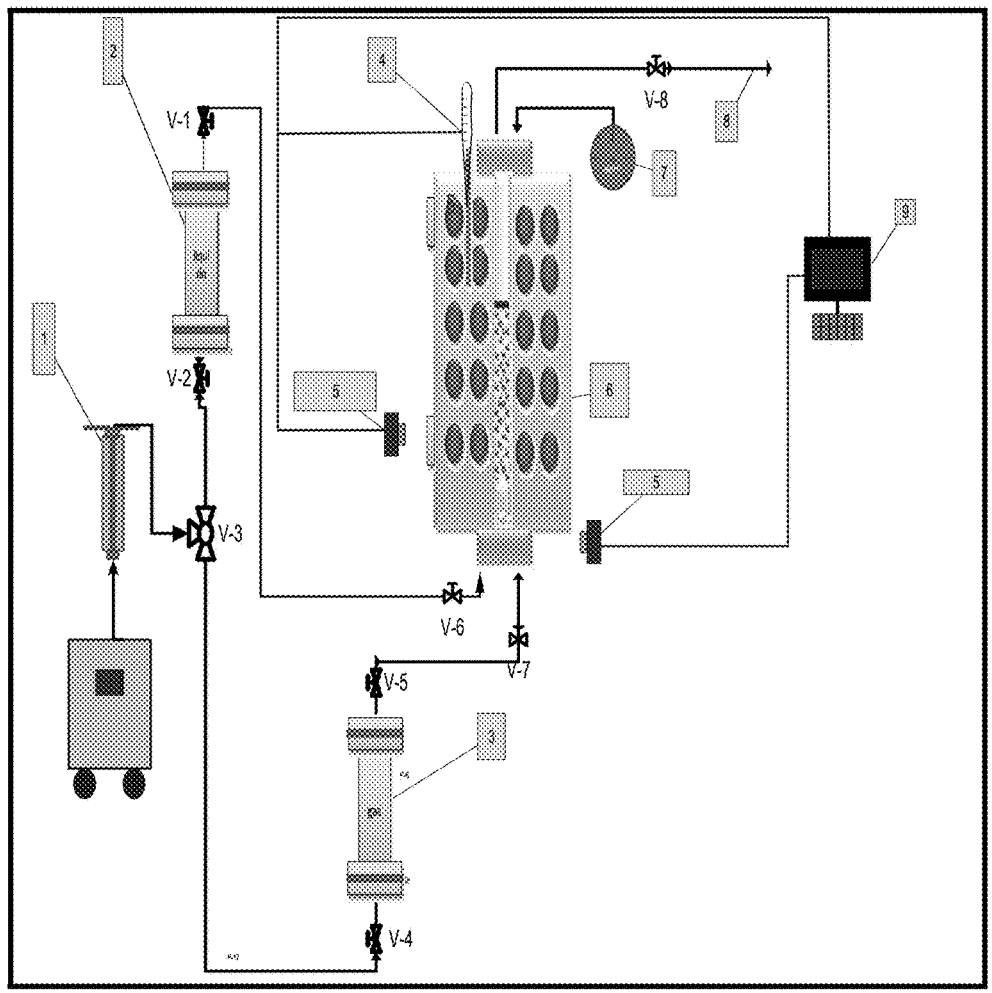

FIG. 13. Diagram of the experimental equipment, High Pressure and High Volume Temperature Visual Cell. In Table 1, the description of the identifiers of FIG. 13 are shown.

TABLE 1

Identifiers of the experimental equipment High Pressure and High Volume Temperature Visual Cell

| Identifier | Description |
| --- | --- |
| 1 | High pressure syringe pump (up to 10,000 psi) |

TABLE 1-continued

Identifiers of the experimental equipment High Pressure and High Volume Temperature Visual Cell

| Identifier | Description |
|---|---|
| 2 | Steel container with sample of liquid to be foamed |
| 3 | Steel sample holder for compressed gas sample |
| 4 | Indicador digital de temperatura de celda visual |
| 5 | High resolution cameras to visualize foam height and remaining liquid height |
| 6 | high volume Visual cell of high pressure and temperature |
| 7 | Digital display of absolute pressure in the visual cell |
| 8 | Purge line of the visual cell |
| 9 | Computer that contains the software that controls the high resolution cameras and calculates the height of the foam and remaining liquid. |

Figure 14:
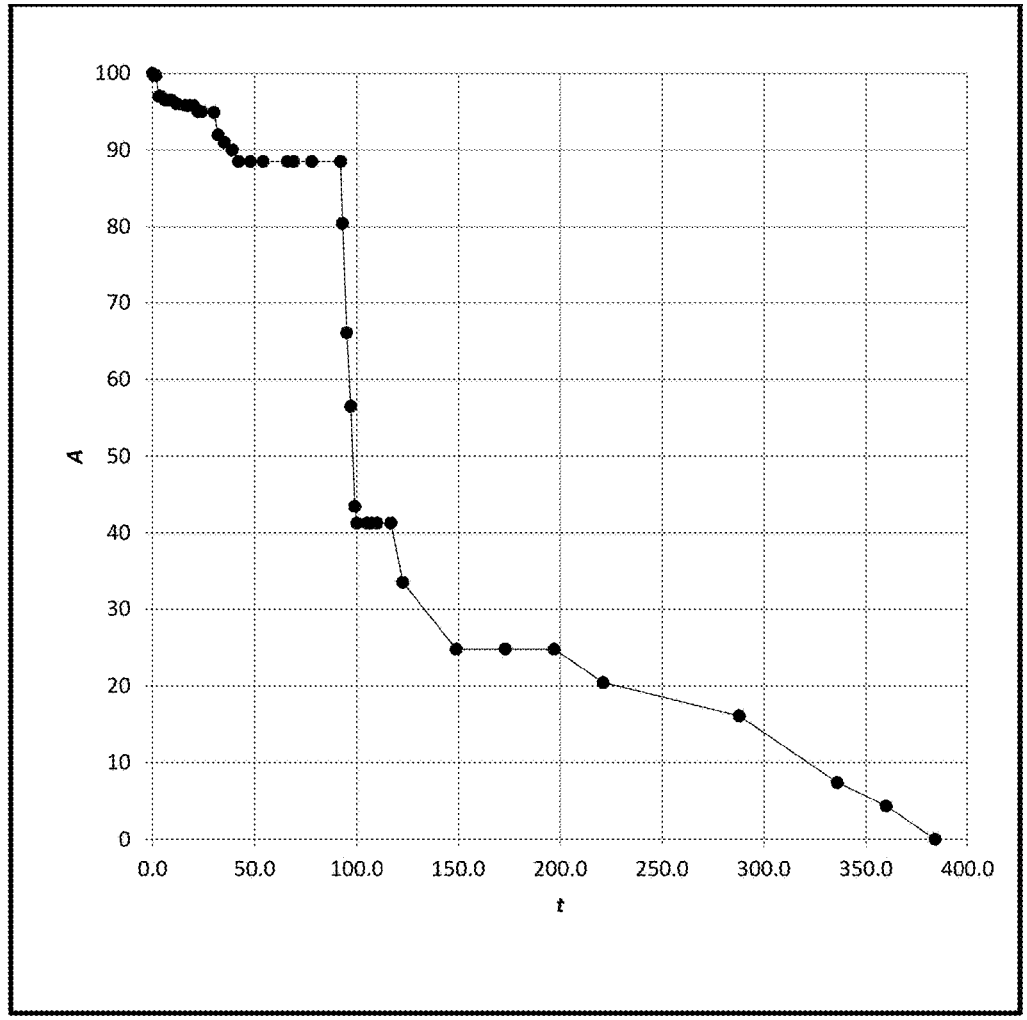

FIG. 14. Performance of foam stability at a pressure of 3500 psi and a temperature of 150° C. and nitrogen gas of the foaming formulation derived from this invention at 0.2% wt. in connate water of 254.873.09 ppm of total dissolved solids. Where A, is the relative height of the foam in percentage and t, is the stability time at that foam height in hours.

Figure 15:
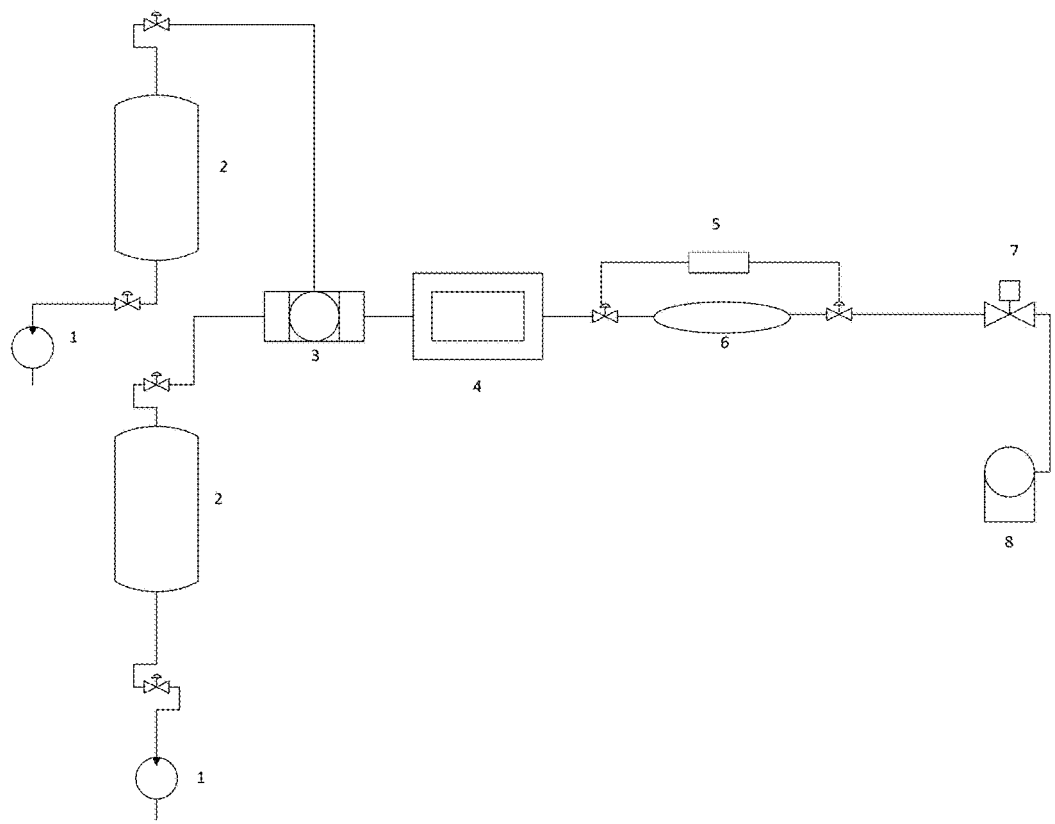

FIG. 15. Diagram of a capillary rheometer to generate the foam and its viscosity measurement for the determination of the rheological model.

In Table 2, the data of the experimental arrangement of FIG. 15 are shown.

TABLE 2

Identifiers of the experimental equipment Capillary Rheometer in FIG. 15

| Identifier | Description |
|---|---|
| 1 | High pressure syringe pumps (up to 10,000 psi) |
| 2 | Stainless steel sample holder containers |
| 3 | Foam generator |
| 4 | Capillary visual cell |
| 5 | Differential pressure transducer |
| 6 | Capillary Rheometer |
| 7 | Back pressure regulator valve, BPR |
| 8 | Foam storage container |

Figure 16:
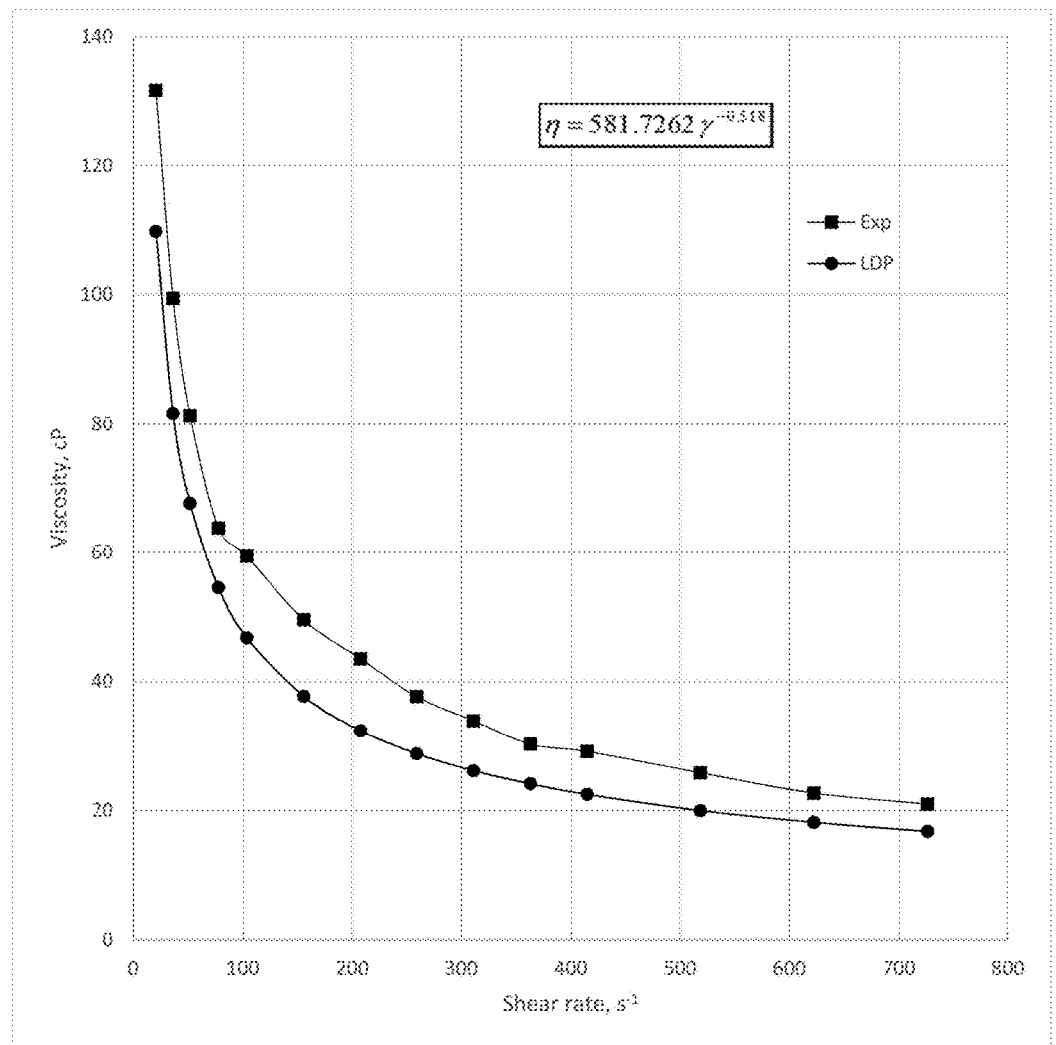

FIG. 16. Rheological behavior of the foaming product derived from this invention for intervals of shear rate of 20 to 700 [1/s] (-■-Exp), adjusted to a power law mathematical model (-●-LDP). The experimental data are shown (table 3) using the equipment described in FIG. 15.

TABLE 3

Experimental data described in FIG. 15, used to determine the rheological model.

| Flow rate Q [cm$^3$/h] | $\Delta P$ [bar] | Experimental viscosity $\mu$ [cP] | Shear arte $\gamma$[1/s] | Shear stress $_T$[Pa]$_T$ |
|---|---|---|---|---|
| 699.9984 | 0.2625 | 20.9560 | 726.4512 | 15.2235 |
| 600.0012 | 0.2434 | 22.6759 | 622.6724 | 14.1196 |
| 500.0004 | 0.2310 | 25.8246 | 518.8937 | 13.4002 |
| 399.9996 | 0.2084 | 29.1262 | 415.1149 | 12.0907 |
| 349.9992 | 0.1896 | 30.2780 | 363.2256 | 10.9977 |
| 299.9988 | 0.1819 | 33.9004 | 311.3362 | 10.5544 |
| 249.9984 | 0.1684 | 37.6584 | 259.4468 | 9.7703 |
| 200.0016 | 0.1557 | 43.5169 | 207.5575 | 9.0322 |
| 150.0012 | 0.1330 | 49.5725 | 155.6681 | 7.7168 |
| 100.0008 | 0.1063 | 59.4224 | 103.7787 | 6.1668 |
| 74.9988 | 0.0855 | 63.7255 | 77.8340 | 4.9600 |
| 50.0004 | 0.0726 | 81.2171 | 51.8894 | 4.2143 |

TABLE 3-continued

Experimental data described in FIG. 15, used to determine the rheological model.

| Flow rate Q [cm$^3$/h] | $\Delta P$ [bar] | Experimental viscosity $\mu$ [cP] | Shear arte $\gamma$[1/s] | Shear stress $_T$[Pa]$_T$ |
|---|---|---|---|---|
| 34.9992 | 0.0622 | 99.3961 | 36.3226 | 3.6103 |
| 20.0016 | 0.0471 | 131.6443 | 20.7558 | 2.7324 |

Figure 17:
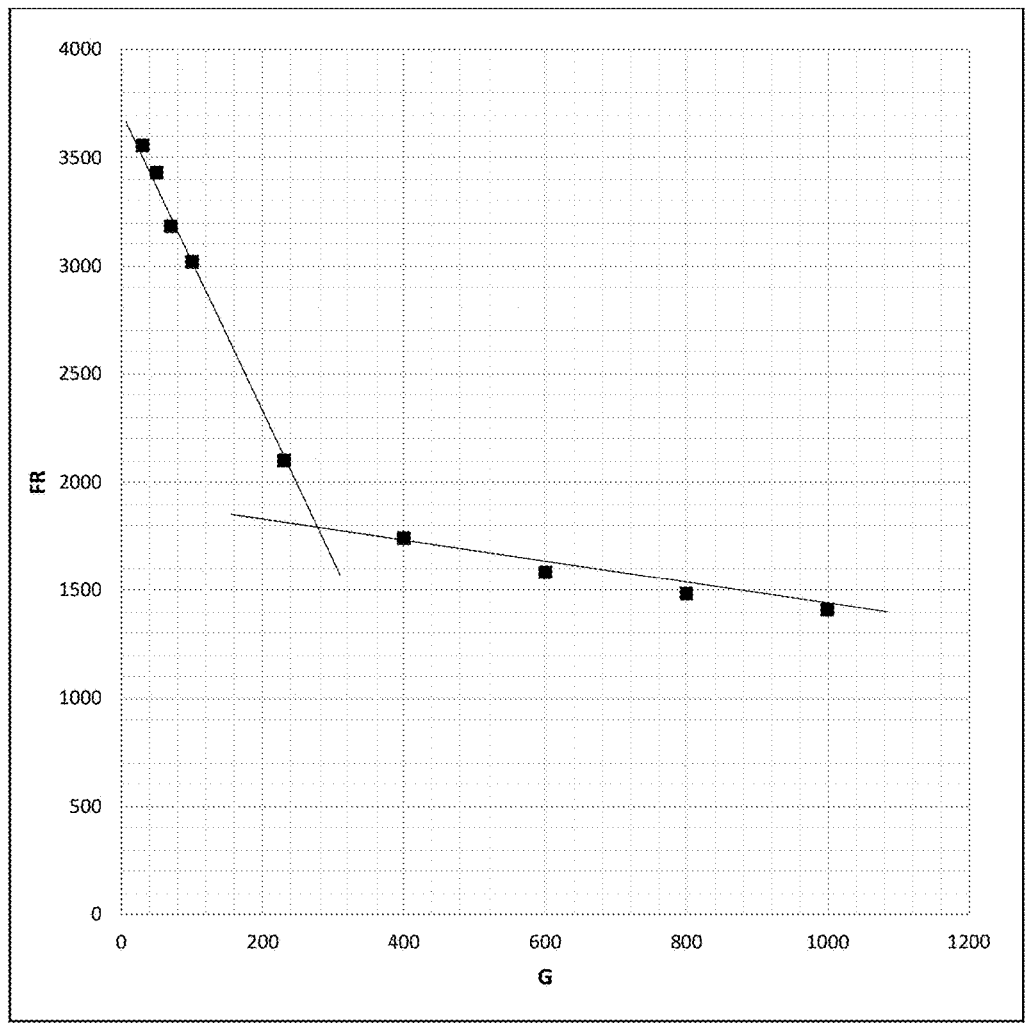

FIG. 17. Factor of mobility reduction of the foaming product derived from this invention at 0.12% wt. in connate water of 254.873.09 ppm of total dissolved solids, compared to nitrogen. Both flooding evaluated in a rock sample with 0.2 mm longitudinal fracture. Where FR, is the foam resistance factor in the rock sample and G, is the flow rate in cm3/h. In table 4, the results of experiments are shown to obtain the resistance factor of the foaming product.

TABLE 4

Experimental data to determine the resistance factor

| Flow rate (cm$^3$/hr) | Differential pressure with foam (psi) | Differential pressure with nitrogen (psi)* | Mobility factor reduction $\Delta P_{foam}/\Delta P_{N2}$ |
|---|---|---|---|
| 30 | 0.22 | 0.00006185 | 3556.88 |
| 50 | 0.354 | 0.00010317 | 3431.23 |
| 70 | 0.46 | 0.00014448 | 3183.74 |
| 100 | 0.623 | 0.00020632 | 3019.52 |
| 230 | 0.99 | 0.00047156 | 2099.41 |
| 300 | 1.195 | 0.0006198 | 1928.05 |
| 400 | 1.43 | 0.00082135 | 1741.04 |
| 600 | 1.95 | 0.00123149 | 1583.45 |
| 800 | 2.439 | 0.00164484 | 1482.82 |
| 1000 | 2.901 | 0.00206003 | 1408.23 |

*Calculated data by using Fluent

DETAILED DESCRIPTION OF THE INVENTION

The present invention involves the stabilizing effect of the interaction of triethanolamine as an additive with mixtures of surfactants of the family of sodium alpha olefinsulfonate with alkylamidopropyl betaines and dodecyltrimethyl ammonium bromide, for the generation of a foaming formulation with improved stability that control the channeling of gas in naturally fractured carbonated deposits to conditions of extreme salinity and temperature.

The water-free chemical composition of this invention consists of: 20% by weight of supramolecular complexes derived from the interaction of sodium alpha olefin sulfonate (C14-C16), 1-Dodecyl sodium sulfonate and 1-Hydroxy 1-Dodecyl sulfonate sodium; 20% by weight of cocoamidopropylbetaine; 10% by weight of dodecyltrimethylammonium bromide and 50% wt of triethanolamine.

For the development of the present invention, the following procedure was followed: 1) Experimental evaluation of foaming formulations based on ions characteristic of brines and gases present in fractured carbonated reservoirs.

The following procedure was carried out for the foaming evaluation and the effectiveness of the formulation of the invention: 1) Measurement of the stability of the foaming formulation at temperature conditions 70° C. and pressure of 9 psi: A) Experimental evaluation of the foaming formulation based in the presence of characteristic ions of brines in carbonated fractured deposits, B) Experimental evaluation of the foaming formulation based on gases in fractured carbonated deposits; 2) Validation of the foaming formulation: A) Measurement of the stability of the foam at high temperature and pressure conditions (150° C. and 3500 psi), B) Rheological model of the foaming formulation at average reservoir conditions, pressure 3500 psi and temperature 150° C., C) Measurement of the performance of the foaming formulation to control the channeling of gas in reservoir rock to extreme pressure and temperature conditions.

1) Foam Stability Measurement at Temperature Conditions of 70° C. and Pressure of 9 Psi The foam generation system at atmospheric pressure was conditioned to evaluate the stability of foams generated by surfactants at a temperature of 70° C. and pressure of 9 psi. This experimental equipment was developed by the inventors of this work and was presented in the Mexican patent application MX/a/2016/016086. This equipment consists of two concentric tubes of borosilicate material with a refractive index of 1.51 to 1.54, which can support a maximum pressure of 30 psi and a maximum temperature of 109.4° C. The outer tube has 50 cm high with a diameter of 7.6 cm, inside, the inner tube has a height of 50 cm and a diameter of 4.35 cm. This diameter was chosen based on the design criteria of the GL 45 covers, which allow coupling a check valve to the diffuser and thus allow to rotate correctly to access the borosilicate cell. The equipment consists of an arrangement of 4 cells of borosilicate with hermetic closure with the necessary instrumentation to disperse a gas from the bottom to a volume of liquid previously fed. The inlet gas pressure is controlled by a pressure regulating valve that lowers the pressure enough to not damage the instrumentation and reduce the risk of explosion; in addition to allowing a gas injection to the cells at a value of 30 psi. The distribution of the gas inlet is carried out with the help of a multiview valve that has the necessary positions to address each of the 4 foam meters, and a manifold system, which allows the air to be expelled in the cell and replaced by the used gas In the annular space between the two borosilicate tubes, a recirculating heating fluid flows through an electromechanical pumping system. In the upper part we have the following instrumentation: a) pressure gauge, b) Gas inlet valve, c) Back pressure regulator valve, d) Relief valve and e) Purge lever valve. In the lower part, the following instrumentation is available: a) check valve, b) valve for gas access and c) 2 micron stainless steel diffuser.

EXAMPLE 1

In a 500 ml bottle equipped with a magnetic stirrer, 0.116 grams of a mixture of supramolecular complexes derived from the interaction of sodium alpha olefinsulfonate (C14-C16), 1-Dodecen sodium sulfonate is diluted at room temperature and atmospheric pressure. and 1-Hydroxy 1-Dodecansulfonate of sodium, with 0.315 grams of cocoamido propylbetaine, plus 0.097 grams of dodecyltrimethylammonium bromide and 0.2142 grams of triethanolamine diluted in reservoir brine with a total solids content of 254.873.09 ppm, of which 49.808.0 ppm belong to the divalent ions of Calcium and 3.204.06 ppm to divalent magnesium ions to obtain 200 ml of brine at 0.12% wt. In FIG. 1 (Behavior of the stability of the foam at 9 psi and 70° C. as a function of time, prepared with brine at 0.12% by weight of the foaming product, foamed with nitrogen gas), it is observed that the minimum stability is reached at 8 hours with 28 minutes, which demonstrates the stabilizing effect of the interaction of triethanolamine as an additive with mixtures of surfactants of the family of the alpha olefinsulfonate sodium with alkylamidopropyl betaines and dodecyltrimethyl ammonium bromide as a foaming agent compared to the product mentioned in the patent MX 2008015989, which has shorter stability times than mentioned in this example.

To demonstrate the advantage of this new formulation that works efficiently in environments of high salinity, temperature, high concentration of calcium chloride and magnesium chloride, as well as the use of different gases for the generation of foam, two study lines were followed, which are mentioned below.

A) Experimental Evaluation of the Foaming Formulation as a Function of Characteristic Ions of Brines in Fractured Carbonated Reservoirs.

EXAMPLE 2

Determination of foam stability generated by the foaming formulation in three types of brine with different dissolved total solids content: a) 5,243.02 ppm [◆], b) 35,524.54 ppm [■] and c) 254,873.09 ppm [▲]. In FIG. 2 (Behavior as a function of time of the stability of the foaming formulation at 9 psi and 70° C. for three different types of brine, at 0.12% by weight of the foaming formulation, using nitrogen), the stability ratio obtained by the interaction of the foaming formulation at 0.12% weight with the increase in the amount of total dissolved solids, showing that the best stability occurs in that brine with the highest content of dissolved solids, which is 254, 873.09 ppm.

EXAMPLE 3

Effect of Sodium Chloride (NaCl) on the Stability of the Generated Foam, by the Foaming Formulation, Result of this Invention.

For the development of this study, the conditions of example 1 were taken as a basis. In the analysis, the starting point was a brine of 254, 873.09 ppm, which contains 10% by weight of NaCl. Variations were made with a NaCl based synthetic brine at the following concentrations: 0% [◆], 3.60% [■] ly 12.10% [▲] and weight, where 0% refers to bidistilled water in order to demonstrate the effect of this salt on the stability of the foam generated by the foaming formulation. The results obtained are shown in FIG. 3 (Behavior of foam stability at 9 psi and 70° C. as a function of time at different concentrations of NaCl, at 0.12% by weight of the foaming formulation of this invention and generated with nitrogen), the analysis of the three curves reported indicate the effect that the presence of the sodium salt has without taking into account the salts of calcium, iron and magnesium present in the brine (254,873.09 ppm) referred to in the example 2. It was determined that the stability of the foam generated increases with the NaCl content, reaching a stability of 5 hours 39 minutes for the concentration of 12.10% by weight demonstrating an improvement in product performance in media with high NaCl content.

EXAMPLE 4

Effect of Calcium Chloride ($CaCl_2$) on the Foam Stability Generated by the Foaming Formulation.

For the development of this study, the conditions of example 1 were taken as a basis. The analysis focused on the variation of the brine of 254, 873.09 ppm which contains 10% by weight of $CaCl_2$, to a synthetic brine based on $CaCl_2$ at the concentrations; 0% 0% [■], 8.57% [▲] and 27.26%

[◆] by weight, it should be mentioned that 0% refers to bidistilled water in order to demonstrate the effect of this salt on the foam stability generated by the foam formulation. The results obtained are shown in FIG. 4 (Behavior of the stability of the foam at 9 psi and 70° C. as a function of time at different concentrations of $CaCl_2$, at 0.12% by weight of the foaming formulation obtained in this invention and generated with nitrogen). The analysis of the three curves reported indicate the effect of the presence of the calcium salt without taking into account the magnesium, iron and sodium salts present in the brine type (254, 873.09 ppm) referred to in the Example 2, obtaining that the stability of the foam generated increases with the $CaCl_2$ content. The foam reaches a stability of 8 hours 48 minutes for the concentration of 27.26% by weight, demonstrating the improvement in product performance in media with high $CaCl_2$ content.

EXAMPLE 5

Effect of Magnesium Chloride ($MgCl_2$) on the Foam Stability Generated by the Foaming Formulation.

For the development of this study, the conditions of example 1 were taken as a basis, focusing the analysis on the variation of the brine of 254, 873.09 ppm which contains 3% by weight of $MgCl_2$, to a synthetic brine based on $MgCl_2$ at the concentrations: 0% [■], 12.81% [▲] and 28.14% [◆] by weight, it is worth mentioning that 0% refers to bidistilled water in order to demonstrate the effect of this salt on the stability of the foam generated for the foaming product obtained from this invention. The results obtained are shown in FIG. 5 (Behavior of the stability of the foam at 9 psi and 70° C. as a function of time at different concentrations of $MgCl_2$, at 0.12% by weight of the foaming formulation and generated with nitrogen). The analysis of the three curves reported indicate the effect of the presence of the magnesium salt without taking into account the calcium, iron and sodium salts present in the brine type (254, 873.09 ppm) referred to in the Example 2. It was determined that the stability of the foam generated increases with the $MgCl_2$ content, reaching a stability of 10 hours 43 minutes for the concentration of 28.14% by weight demonstrating the improvement in product performance in media with high $MgCl_2$ content.

EXAMPLE 6

Effect of the Interaction of $CaCl_2$ and $MgCl_2$ on the Stability of the Foam Generated by the Foaming Formulation.

For the development of this study, the conditions of Example 1 were taken as a basis, focusing the analysis on the variation of the brine from 254, 873.09 ppm to a synthetic brine based on 11.3% by weight of $CaCl_2$ and 13.2% by weight of $MgCl_2$. This, in order to observe the performance of the product when it is in a medium with high content of the aforementioned salts compared to the percentage of the content of these salts present in the brines used in example 2. The results obtained from the stability of the foam in the test is shown in FIG. 6 (Behavior of the stability of the foam at 9 psi and 70° C. as a function of time, prepared in brine with $CaCl_2$ and $MgCl_2$ content, at 0.12% by weight of the formulation foaming and generated with nitrogen), the analysis of the results indicate that the minimum stability is reached in a time of 10 hours 07 minutes, indicating the benefit of the interaction of these two divalent ions (calcium and magnesium) in the stability. It was demonstrated that the foaming formulation can be used efficiently in environments of high salinity and high concentration of divalent calcium and magnesium ions.

A) Experimental Evaluation of the Foaming Formulation as a Function of Gases in Fractured Carbonated Reservoirs

EXAMPLE 7

Determination of the Stability of the Foam Generated by the Foaming Formulation with Methane Gas.

The results obtained using the conditions of Example 1, but focusing the study on the variation of nitrogen by methane. The results are shown in FIG. 7 (Behavior of foam stability at 9 psi and 70° C. as a function of time, prepared with brine at 0.12% by weight of the foaming formulation, generated with methane). The analysis of the results indicates that the minimum stability is reached in a time of 3 hours with 20 minutes.

EXAMPLE 8

Determination of the Stability of the Foam Generated by the Foaming Formulation with Carbon Dioxide Gas.

The results obtained using the conditions of Example 1 but focusing the study on the variation of nitrogen by methane are shown in FIG. 8 (Behavior of foam stability at 9 psi and 70° C. as a function of time, prepared with brine at 0.12% by weight of the foaming formulation, generated with $CO_2$). The analysis of the results indicates that the minimum stability is reached in a time of 50 minutes.

A comparison between the results of foam stability generated by the foaming formulation are shown in FIG. 9 (Comparative of the behavior of the stability of the foams at 9 psi and 70° C. as a function of time, prepared with brine at 0.12% by weight of the foaming formulation, generated with $N_2$ [◆], $CH_4$ [■] and $CO_2$ [▲], respectively). The foam generated with nitrogen is 2.54 times more stable than that generated with methane gas and 10.19 times more stable than the foam generated with carbon dioxide. Based on the above, it is demonstrated that the foaming formulation developed in this invention can be used for its use of the aforementioned gases, having an improvement when nitrogen is used.

To determine the gas ratio at which the foaming formulation exceeds the stability times thrown when individual gases (nitrogen, methane or carbon dioxide) are used, foam gas mixtures were made.

EXAMPLE 9

Determination of the Stability of the Foam Generated by the Foaming Product Obtained in this Invention with Mixtures of Nitrogen-Carbon Dioxide.

The results obtained using the conditions of Example 1 but focusing the study on the variation of nitrogen in a nitrogen-carbon dioxide mixture are shown in FIG. 10 (Comparative of the behavior of the stability of the foams at 9 psi and 70° C. in time function, prepared with brine at 0.12% by weight of the foaming formulation, generated with $N_2$—$CO_2$ mixtures). The analysis of the results indicate that the system with the best stability is the one that corresponds to the mixture that contains 80% nitrogen and 20% carbon dioxide [◆], with a time of 7 hours and 2 minutes.

With the series of examples mentioned above it has been demonstrated in a novel way that the foaming formulation can be used to generate foams with different gases, either pure or in mixtures.

EXAMPLE 10

Determination of the Foam Stability Generated by the Foaming Formulation with Methane-Carbon Dioxide Mixtures.

The results obtained using the conditions of example 1 but focusing the study on the variation of nitrogen in a mixture of methane and carbon dioxide are shown in FIG. 11 (Comparative of the behavior of the stability of the foams at 9 psi and 70° C. as a function of time, prepared with brine at 0.12% by weight of the foaming formulation, generated with $CH_4$—$CO_2$ gas mixtures). The analysis of the results indicates that the stability for the three systems of mixed gases exceeds the times reached when pure gases are used. The system that presents the best stability is that which corresponds to the mixture 80% methane and 20% carbon dioxide, with a time of 6 hours and 35 minutes.

EXAMPLE 11

Determination of the Stability of the Foam Generated by the Foaming Product Derived from this Invention with Mixtures of Nitrogen-Methane Gas.

The results obtained using the conditions of Example 1 but focusing the study on the variation of nitrogen gas in a mixture of nitrogen gas and methane are shown in FIG. 12 (Comparative of the behavior of the stability of the foams at 9 psi and 70° C. as a function of time, prepared with brine at 0.12% by weight of the foaming formulation, generated with gas mixtures $N_2$—$CH_4$). The analysis of the results indicates that the stability for the three systems of gas mixtures exceeds the times reached when pure gases are used. The system that presents better stability is the one that corresponds to the mixture 80% nitrogen and 20% methane, with a time of 11 hours and 35 minutes.

The versatility and efficiency of use of the formulation product of this invention is demonstrated, as a foaming agent in reservoirs where different types of gases are present.

Validation of the Foaming Formulation

A) Measurement of Foam Stability at High Temperature and Pressure Conditions (150° C. and 3500 psi)

The high-pressure foam generation system consists of a stainless steel cell with a borosilicate tube 2.4 cm in, inner diameter and 3.5 cm in length, adapted as shown in FIG. 13 (Diagram of the experimental equipment, Visual Cell High Pressure and Large Volume Temperature).

This cell is instrumented with the following materials: foaming solution outlet valve, pressurization fluid injection valve to steel sample holder with solution content, three-way valve for pressurizing the sample-containing steel containers with gas content and solution, gas injection valve to the line that connects to the cell, pressurization fluid injection valve to the steel container sample holder with gas content, valve for gas injection to the cell, valve for pressure relief inside the cell, pump to pressurize the sample steel containers, temperature controller, pressure gauge in the cell and thermocouple for temperature monitoring in the cell.

To carry out the measurement of the stability of the foam and its ability to foam, a process was used consisting of 5 stages and described below: a) Prepare a solution with the foaming formulation at 0.12% by weight with brine of reservoir with a total solids content of 254,873.09 ppm, of which 49,808.0 ppm belongs to divalent calcium ions and 3,204.06 ppm to divalent magnesium ions; pressurizing a sample steel vessel, where said solution will be contained at the corresponding pressure of the test, b) Prepare the N2 gas by pressurizing the sample steel vessel where said gas will be contained, c) Conditioning the High Visual cell Temperature and High Volume Pressure where this experiment is carried out. Conditioning consists of heating the jacketed cell to the temperature of the test and creating a pressure atmosphere with nitrogen gas to generate a pressure differential. D) Inject the solution prepared in (a) until reaching a height of 7. mm above the gas diffuser, e) Inject the gas through a 2 micron diffuser for 2 minutes counted with a stopwatch to generate the foam at a certain height such that the desired pressure and temperature conditions are achieved, f) Suspend the injection of the gas and wait for the pressure of the steel container carrying gas sample to reach the study pressure e) Take data of liquid heights and foams with respect to time and see the behavior of the stability at these operating conditions.

EXAMPLE 12

Determination of the Stability of the Foam Generated by the Foaming Formulation at 0.12% Weight in Congenital Water with a Salinity of 254,873.09 ppm of Total Dissolved Solids.

The stability of the foam generated by the foaming formulation was evaluated through a pressure spectrophotometry of 3500 psi, temperature of 150° C. and nitrogen.

The time established to obtain each parameter (foam height and liquid height) was approximately 20 minutes. In FIG. 14 (Behavior of the foam stability at a pressure of 3,500 psi and a temperature of 150° C. and nitrogen gas of the foaming formulation at 0.12% in congenital water of 254, 873.09 ppm.) Shows the stability ratio obtained with the foaming formulation in time and it is observed that the minimum stability is reached in a time of 384 hours.

A comparison between the time observed in the foam tests for the same foaming formulation, under pressure of 9 psi (example 1) and high pressure (example 12) shows that the increase in foam stability generated by the foaming formulation is 48 times higher than the test at atmospheric conditions, which indicates that the increase in pressure has a positive effect on the stability of the foam for this product.

A) Rheological Model of the Foaming Formulation at Average Reservoir Conditions, Pressure 3500 psi and Temperature 150° C.

The foam generation system at average reservoir conditions: 150° C. and 3500 psi, for its application as a gas mobility control agent is shown in FIG. 15. It consists of two stainless steel sample holder containers with a capacity of 1000 ml storing the foaming solution and nitrogen gas, respectively, a foam generator and a visual borosilicate cell, which has the following instrumentation: A) Differential pressure sensor B) Pressure sensors C) Temperature sensors D) Liquid collector.

In this way, the foam generation process is as follows: A) Synthesize the aqueous solution of surfactant and fill the sample steel vessels, B) Pressurize the system at operating pressure used nitrogen gas, C) Carry the system to the temperature of experimentation and monitor it by means of temperature sensors, D) Opening of valves of the sensor that determines the pressure differential, E) Injection of the foaming formulation for the filling of the lines and of the foam generator, F) Injection of nitrogen gas, G) Determine the parameters (pressure differential, shear stress, cutting speed and Newtonian viscosity) necessary for the determination of the Rheological Model.

EXAMPLE 13

Determination of the Rheological Model of the Foam Generated by the Foaming Product Derived from this Invention at 0.12% by Weight with Brine of Total Dissolved Solids Content of 254.873.09 ppm.

The cut-off speed ranges at which the experimental viscosity measurements were made were from 20 to 700 [1/s], the expenditures from which the pressure differentials and cutting speeds were obtained are shown in Table 3, with the experimental data we proceed to the determination of the rheological model, with the equation shown in FIG. 16. We can calculate data that were not obtained experimentally, it should be mentioned that this equation is only valid for a range of cutting speed established, for this particular case from 20 to 700 [1/s], below or above this interval another viscosity equation must be obtained.

B) Measurement of the Performance of the Foaming Formulation to Control the Channeling of Gas in Reservoir Rock to Extreme Pressure and Temperature Conditions.

Gas mobility control experiments were carried out by means of foam injection and consist of the following equipment: Fluid injection pump, core holder, fractional fluid collector, high pressure fluid container cylinder, display cell, overpressure pressure (backpressure) and foam generator. This experimental equipment was developed by the inventors of this work and was presented in the Mexican patent application MX/a/2016/016451.

The materials used in this experiment were the following:

Nucleus: The representative rock sample of a deposit of extreme salinity and temperature. The core characteristics are: Before the fracture; a) Total volume, 1715.7 cm3 b) porous volume, 29.5 cm3, c) porosity, 1.7%, d) absolute permeability, 0.0003 mD and after the fracture; a) Total volume, 1715.7 cm3, b) porous volume, 34.1 cm3, c) porosity, 2.0%, d) absolute permeability (taking into account the effective flow area), 29.5 D. Fluids: Representative oil from an extreme reservoir salinity and temperature, congenital brine of 254,873.09 ppm of total dissolved solids, foaming formulation derived from this invention and nitrogen gas. The foam is formed with 80% volume of gas (nitrogen) and 20% volume of water of the congenital brine, plus the foaming product at a concentration of 0.12% by weight.

The experimental procedure used to evaluate the ability of the foam to control the gas pipeline in fractured systems consists of four stages that are described below 1. Saturation of the rock:
    a. 100% rock saturation with brine: The reservoir rock sample is 100% saturated with congenital brine and left to age for 1 week at 150° C. and 3500 psi.
    b. Saturation with oil: Oil from the reservoir is displaced in the fracture of the rock until it reaches the saturation of irreducible water. The aging time at 150° C. and 3500 psi was 2 months.
2. Nitrogen injection:
    a. Nitrogen injection: The nitrogen was displaced at an expense of 8.7 cm3/h in the fractured system to simulate the speed of advance of the gas-oil contact and the amount of oil recovered is measured.
3. Foam injection:
    a. Foam injection: The foam was displaced in the fractured system at a defined expense and the pressure drop between the entrance and the exit is recorded at all times.
4. Nitrogen injection:
    a. Nitrogen injection: Nitrogen gas was injected once the foam was formed and placed inside the fractured system in order to measure the maximum differential supported by this foam. The pressure differential during this procedure was measured at all times.

EXAMPLE 14

Determination of the Foam Resistance Factor Generated with the Foaming Formulation Derived from this Invention at 80% Quality with Nitrogen Gas and Formation Brine of 254,873.09 ppm of Dissolved Total Solids, in a Reservoir Core with Induced Artificial Fracture.

The results of the pressure differentials obtained under the expenses indicated in Table 4 (Experimental results of the pressure differential of the foam with the foaming formulation derived from this invention obtained at a fracture spacing of 0.2 mm) are presented. Fracture spacing of 0.2 mm and to guarantee said spacing, metal beads were used. In FIG. 17 (Factor of reduction of mobility of the foaming formulation derived from this invention at 0.12% by weight in congenital water of 254.873.09 ppm of total dissolved solids, with respect to nitrogen in rock sample with 0.2mm longitudinal fracture).

The resistance factors of the foam were obtained and according to the results it is established that:

At low costs, this is from 30 $cm^3/h$ to 70 $cm^3/h$, the foam formed with the foaming formulation derived from this invention at a concentration of 0.12% weight, presents a greater reduction factor of mobility. The capacity to reduce mobility decreases as the injection expense increases, indicating that this foam is less resistant to high costs, that is, from 400 $cm^3/h$ to 1000 $cm^3/h$. The maximum pressure differential supported by the foam placed inside the fracture during the injection of nitrogen (0.1 injected porous volumes of nitrogen gas) was 1,312 psi. This pressure differential indicates a blockage of nitrogen gas through the fracture (the resistance factor for this case is 1847.88) so that the inrush to the injection of nitrogen gas in an artificial fracture in the sample of rock used is of 350 $cm^3/h$. With which, it is indicated that injection of the foam of the foaming formulation derived from this invention is feasible as a gas mobility control process in wells that have a high oil gas ratio.

The invention claimed is:

1. A formulation with foaming properties that control the channeling of gas in naturally fractured carbonated reservoirs, the formulation comprising:
    a mixture of 20% by weight of supramolecular complexes derived from the interaction alpha-olefinsulfonate sodium (C14-C16), with 1-dodecene sodium sulfonate and 1-hydroxy-1-dodecansulfonate sodium, and
    triethanolamine as a stabilizing additive.

2. The formulation according to claim 1, wherein the formulation comprises triethanolamine in an amount of 50% by weight.

3. The formulation according to claim 1, further comprising 20% by weight of cocoamidopropylbetaine.

4. The formulation according to claim 1, further comprising 10% by weight of dodecyltrimethylammonium bromide.

5. The formulation according to claim 1, wherein the formulation is stable at a temperature of 70° C. and 9 psi gauge pressure.

6. The formulation according to claim 5, wherein the formulation generates a foam that is stable in the presence of ions characteristic of brines in fractured carbonated reservoirs.

7. The formulation according to claim 6, wherein the formulation generates a foam that is stable in the presence of gases in fractured carbonated reservoirs.

8. A The formulation according to claim 1, wherein the formulation generates a foam that is stable at a temperature of 150° C. and 3,500 psi of pressure.

9. The formulation according to claim 5, wherein the formulation generates a foam that can withstand a range of salinity greater than 254,000 ppm total dissolved solids.

10. The formulation according to claim 9, wherein the formulation generates a foam that is stable in a brine with a maximum concentration of 700,000 ppm of magnesium chloride.

11. The formulation according to claim 9, wherein the formulation generates a foam that is stable in a brine with a maximum concentration of 300,000 ppm of calcium chloride.

12. The formulation according to claim 9, wherein the formulation generates a foam that is stable in brine with a maximum concentration of 140,000 ppm of sodium chloride.

13. The formulation according to claim 1, wherein the formulation comprises triethanolamine in an amount of 50% by weight, and wherein the formulation further comprises 20% by weight of cocoamidopropylbetaine, and 10% by weight of dodecyltrimethylammonium bromide.

14. A method of controlling mobility of gas in reservoir rocks at extreme pressure and temperature conditions, the method comprising adding the composition of claim 1 to a naturally fractured reservoir.

15. The method of claim 14, wherein the composition is added to through an injector well and a producer well.

* * * * *